United States Patent [19]

Kosslow et al.

[11] Patent Number: 5,524,809

[45] Date of Patent: Jun. 11, 1996

[54] SOLDERING INSTRUMENT SAFETY IMPROVEMENTS

[75] Inventors: William J. Kosslow, Jefferson Boro; Ronald W. Giron, Delmont, both of Pa.

[73] Assignee: The United States of America as represented by the United States Department of Energy, Washington, D.C.

[21] Appl. No.: 294,277

[22] Filed: Aug. 22, 1994

[51] Int. Cl.$^6$ .................................................. B23K 3/03
[52] U.S. Cl. ........................................ 228/20.5; 219/230
[58] Field of Search .......................... 219/230; 228/20.5, 228/20.1

[56] References Cited

U.S. PATENT DOCUMENTS

| | | |
|---|---|---|
| 1,520,597 | 12/1924 | Reavis . |
| 1,928,129 | 9/1933 | Hornack . |
| 2,184,980 | 12/1939 | Smith . |
| 3,048,687 | 8/1962 | Knowles . |
| 3,336,462 | 8/1967 | Fuller . |
| 4,074,110 | 2/1978 | Slaughter . |
| 4,607,151 | 8/1986 | Kihlstrom . |
| 5,080,277 | 1/1992 | Diaconu et al. ................ 219/230 X |

FOREIGN PATENT DOCUMENTS 1483257  8/1977  United Kingdom ................ 219/230

OTHER PUBLICATIONS

"Smoke-Free Hand Soldering", New Products, EE, Mar. 1987.

*Primary Examiner*—Kenneth J. Ramsey
*Attorney, Agent, or Firm*—Virginia B. Caress; William R. Moser; Paul A. Gottlieb

[57] ABSTRACT

A safe soldering device includes a retractable heat shield which can be moved between a first position in which the solder tip of the device is exposed for soldering operation and a second position in which the solder tip is covered by the heat shield. Preferably, the heat shield is biased towards the second position and may be locked in the first position for ease of use. When the soldering device is equipped with a vacuum system, the heat shield may serve to guide the flow of gases and heat from the solder tip away from the work area. The heat shield is preferably made of non-heatsinking plastic.

15 Claims, 3 Drawing Sheets

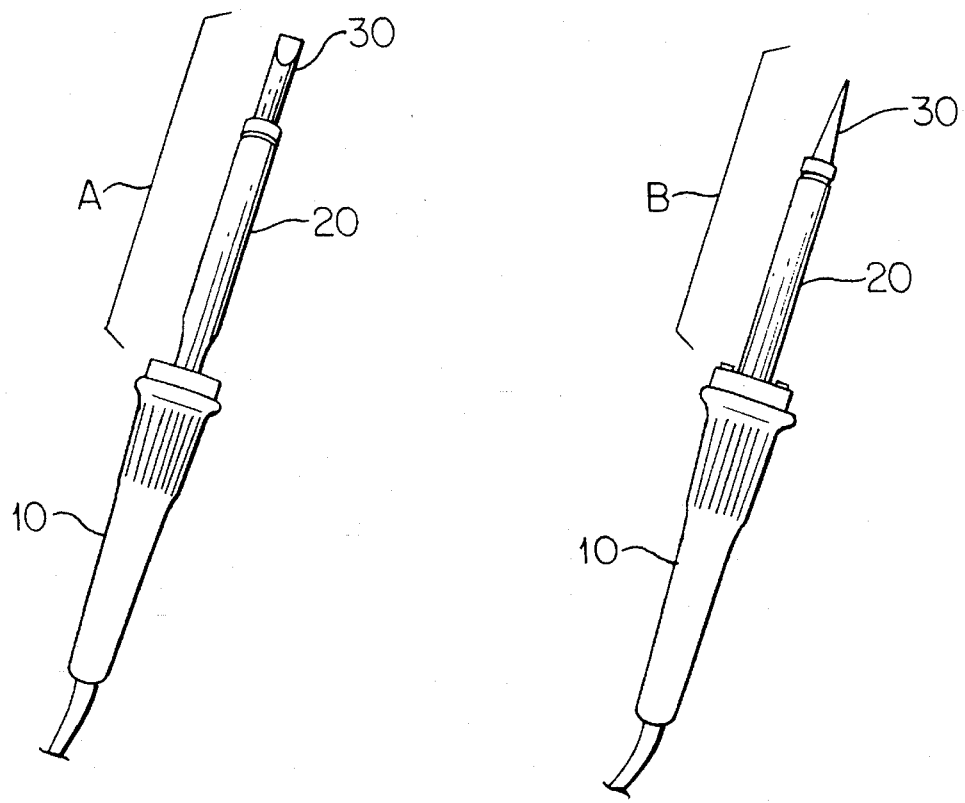
FIG. 1a
(PRIOR ART)
FIG. 1b
(PRIOR ART)
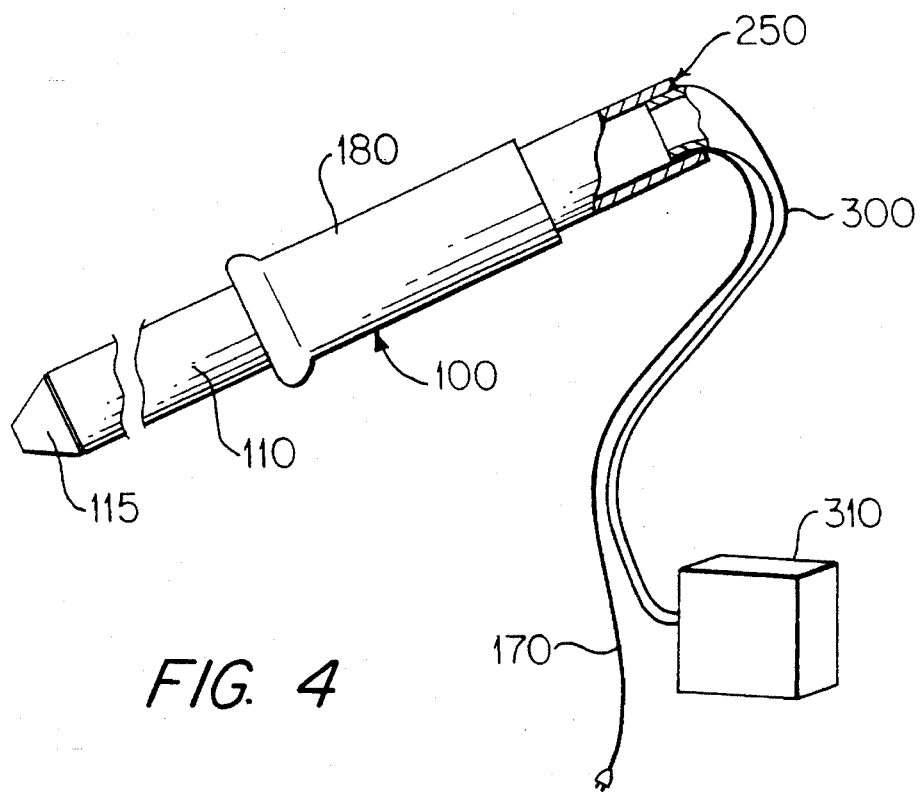
FIG. 4

SOLDERING INSTRUMENT SAFETY IMPROVEMENTS

BACKGROUND OF THE INVENTION

1. Origin of the Invention

The invention described herein was made pursuant to a Department of Navy contract number N00024-79-C-4026 and may be manufactured and used by or for the U.S. Government for governmental purposes without any payment of royalties thereon or therefor.

2. Field of the Invention

The present invention relates to soldering tools, and more specifically, to devices for enhancing the safety of soldering tools.

3. The Prior Art

Many improvements have been incorporated into soldering devices which facilitate the soldering process. These include heat sensing elements to control temperatures up to 850°, interchangeable soldering tips, integrated soldering stations, and methods to increase production time by speeding up the heatup time of a soldering iron. However, few attempts have been made to improve the safety of soldering equipment. Safety concerns such as an operator coming into contact with an exposed solder iron tip or a fire resulting from an exposed solder iron still exist. FIGS. 1a and 1b illustrate representative soldering irons currently on the market. These irons have a handle 10, a heated cartridge 20 and a hot tip 30. As indicated by brackets A and B in FIGS. 1a and 1b, although only about two percent of the solder iron is used to heat the solder, forty to fifty percent of a typical solder iron consists of exposed metal at temperatures between 500° and 800°.

In air vacuum systems presently on the market, such as the Fumex® product line, smoke and gases are eliminated from the working area using a smoke vacuum tube which is approximately the same diameter as, and runs parallel to, the soldering tip. However, this device has several disadvantages: 1) the smoke and gases may not be collected into the tube if the vacuum tube is not directly positioned above the soldering tip, 2) if the vacuum tube is directly above the soldering tip, the user's view of the immediate solder area is blocked, 3) the vacuum tube will hinder soldering in tight working spaces since it effectively increases the diameter of the iron by a factor of at least two, and 4) because the tube is in such close vicinity to the solder iron tip and takes in hot smoke and gases, the metallic vacuum tube heats up to temperatures near that of the iron's tip which effectively doubles the high temperature hazards of the solder iron.

Another type of fume exhausting soldering iron, which alleviates some of these disadvantages, is disclosed in U.S. Pat. No. 2,184,980 to F.S.C. Smith. In the Smith patent, the fume conducting means includes a cylindrical skirt having its forward end flared outward. The flared end does not extend over the end of the tip. However, the flared end may limit the user's view of the immediate solder area and the heating problems associated with a metallic vacuum tube so close to the hot tip are still present, as is evident from the inclusion of a heat insulating sleeve surrounding the heat member of the tip in order to prevent any heat transmitted to the fume exhausting means from reaching the handle.

SUMMARY OF THE INVENTION

It is an object of the present invention to eliminate the above mentioned disadvantages and to make soldering instruments safer and easier to use.

According to one aspect of the present invention, a non-heatsinking, protective shield is provided around the soldering tip of the solder iron. This heat shield covers the iron's hot tip throughout the soldering process with the exception of the time needed to perform an actual solder connection using the tip. The shield protects the user or nearby personnel from harm when the soldering iron is at elevated temperatures (500° F. to 800° F). Serious burns can result if the user accidentally touches the exposed portion of the iron or if someone in the area unintentionally pulls the power cord causing the hot iron to drop onto the user's lap. Moreover, the shield is capable of preventing fires which might result if the iron's tip inadvertently comes into contact with an object that can be easily ignited, e.g. paper.

According to another aspect of the present invention, an air vacuum system is incorporated into the soldering iron's protective heat shield to remove the solder smoke (gases), thus avoiding inhaling of this smoke by the user and eliminating the smoke from the general work area. Soldering iron air vacuum systems available on some of the current soldering irons consist of bulky metallic tubes that not only double the surface area that is elevated to high temperatures, but also block the operator's line of sight during the solder process and immobilize the solder iron in tight spaces, e.g. between chips on a board. By incorporating an air vacuum into the protective heat shield, harmful gases can be eliminated from the work area without hampering the soldering process.

Other objects, features and advantages of the invention will be set forth or are apparent from the following description of the preferred embodiments.

BRIEF DESCRIPTION OF THE DRAWINGS

FIGS. 1a and 1b illustrate prior art solder devices having exposed heated areas;

FIG. 3 is a side cross sectional view of the device as shown in FIG. 2a; and

FIG. 4 illustrates an alternative configuration of the vacuum system for the soldering device.

DETAILED DESCRIPTION OF PREFERRED EMBODIMENTS

Figure 2A:
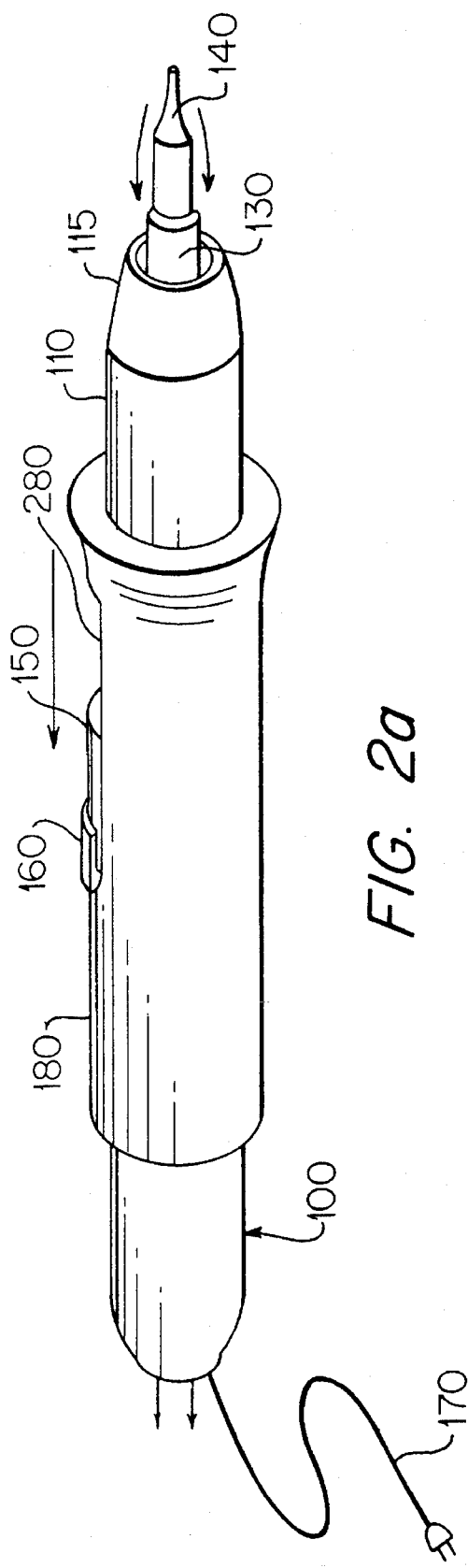
FIG. 2a is a side plan view of a soldering device of the present invention, when the heat shield is in an exposed position.
Figure 2B:
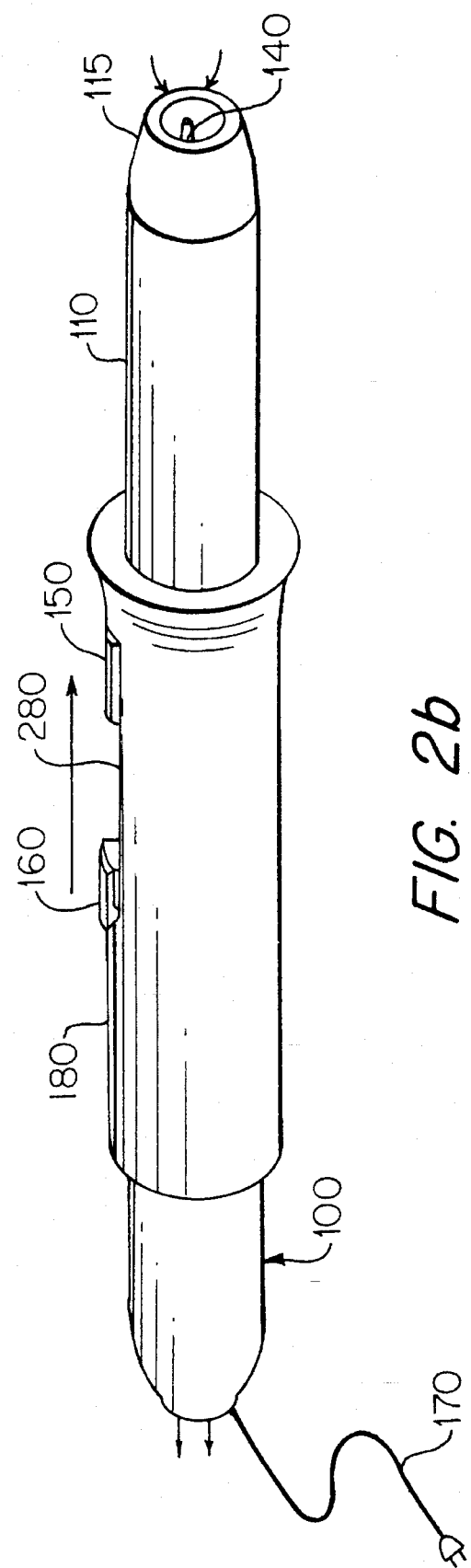
FIG. 2b is a side plan view of a soldering device of the present invention where the heat shield is in a protective position.

Referring to FIGS. 2a and 2b, a soldering device 100 is shown which includes a solder iron tip 140 and an outer solder iron casing 130. A protective heat shield 110 includes a cylindrical tube encircling a portion of the device, as illustrated. Heat shield 110 is partially enclosed by another solder iron casing 180. Heat shield 110 preferably includes an inwardly tapered forward end portion 115 at the end closest to the solder iron tip 140.

Heat shield 110 is constructed so that it can be moved between a retracted position shown in FIG. 2a in which solder iron tip 140 is exposed for soldering and an advanced protective position shown in FIG. 2b. Retracting of heat shield 110 is effected by pushing a sliding switch 150. Heat shield 110 can be maintained in the retracted position by engaging switch 150 with an engaging portion or retaining finger 160 formed integral with solder iron casing 180.

Switch 150 is locked in position by being depressed/inserted under finger 160 and then released to engage finger 160. This allows the operator to solder without having to continuously hold the button 150 in this position.

Figure 3:
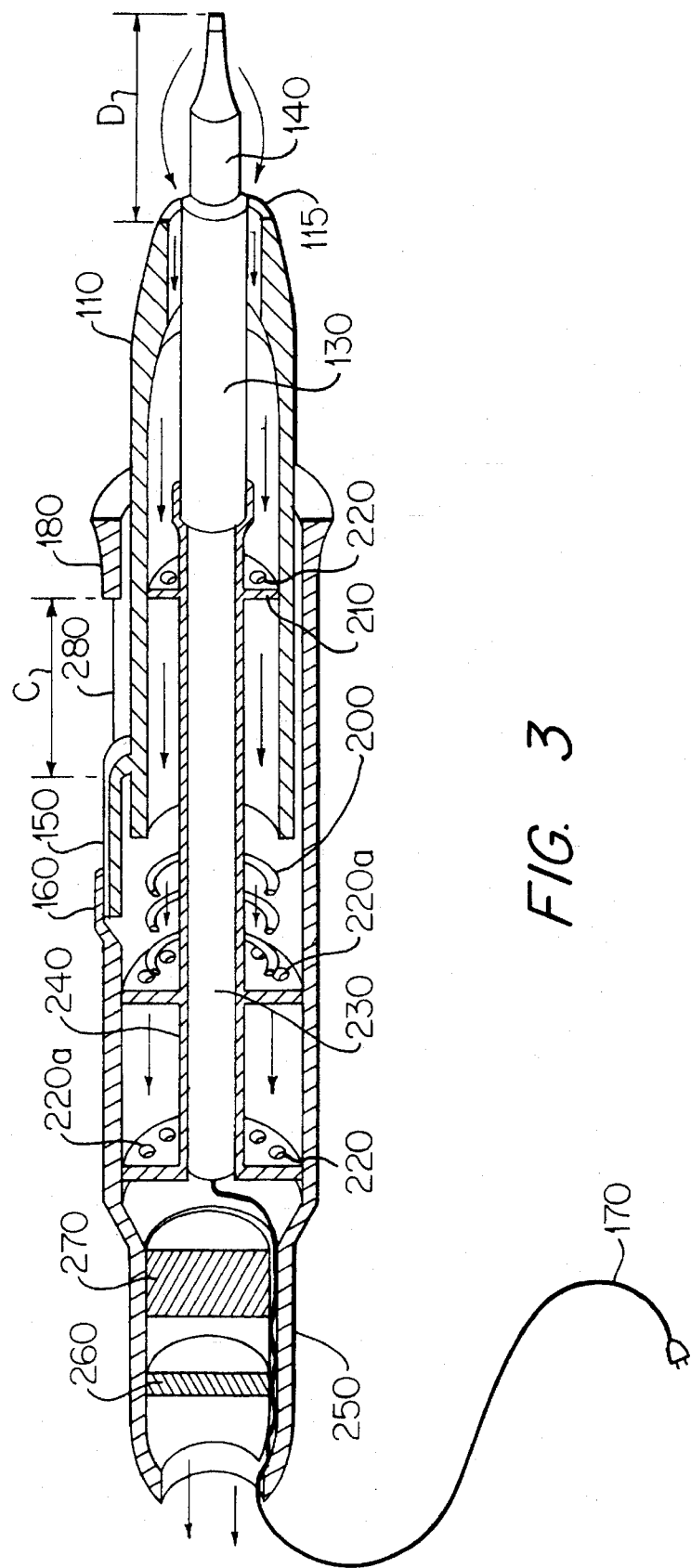

Referring to FIG. 3, a helical coil spring 200, located behind heat shield 110 on the interior of the soldering device 100, forces or biases heat shield 110 forward towards the protective position shown in FIG. 2b. When the operator is done soldering, the operator can depress sliding switch 150 to disengage switch 150 from retaining finger 160 and heat shield 110 will snap forward to the protective position. In this protective position, tip 140 is covered. The soldering device 100 may then be safely set down without burning someone or something. Sliding switch 150 slides within a slot or opening 280 provided in the top of solder iron casing 180, and rearward and forward movement of heat shield 110 is restricted by the interaction of sliding switch 150 with the portions of solder iron casing 180 defining the limits of slot 280.

Referring again to FIG. 3, the internal construction of soldering device 100 is illustrated. A heating element 230, which is surrounded by a metal heat shield 240, is energized via a cord 170. The movement of heat shield 110 within the solder device 100 is guided by a circular mechanical stop or guide member 210 which is affixed to and extends outwardly from metal heat shield towards solder iron casing 180. Stop 210 is advantageously located just ahead of the front or distal end of the slot or opening 280 of solder iron casing 180 through which sliding switch 150 extends and supports and guides shield 110 as it moves between the protective position and the retracted position (shield 110 being shown in the retracted position in FIG. 3). The double ended arrows C and D represent the distance moved by sliding switch 150 and heat shield 110 between the retracted position shown and the protective position corresponding to that shown in FIG. 2b. Washers or support discs 220, having holes 220a therein to allow the flow of solder gas to pass through, support heating element 230 and its metal heat shield 240 within casing 180. Washers 220 are disposed in spaced relationship within casing 180 rearwardly of slot or opening 280. The washer 220 closest to slot 280 also serves as a stop for spring 200.

Heat shield 110 also serves as the air intake of the smoke vacuum system of soldering device 100. The path of the solder smoke and gases is indicated by the arrows in FIGS. 2a, 2b and 3. Solder smoke and its associated gases are removed through heat shield 110 by the vacuum of a micro-sized fan 270 located at the rear of solder device 100. A suitable fan is the 2412 Micro Blazer manufactured by IMC Corporation. Fan 270 may be powered from the same 115 VAC solder device power source used to power the solder iron. Solder smoke is forced through a small carbon filter 260 to clean exhaust leaving solder device 100 at its rear. The rear portion 250 of soldering device 100 may be unscrewed for periodically replacing filter 260. An air tube, not shown, may be attached to the rear of soldering device 100 to further transport the filtered solder smoke from the work area.

Advantageously, the vacuum system is operational continuously independent of whether heat shield 110 is in the protective or retracted position. In the retracted position, the vacuum system will eliminate smoke and gases from the work area. In the protective position, the vacuum system will exhaust the additional heat created by iron tip 140 in a closed environment. The fan speed is chosen by the design manufacturer to provide sufficient suction for the solder smoke, yet with minimal effect on the temperature of solder tip 140 and without causing the application to cool prematurely, thus producing a weak solder connection.

Advantageously, heat shield 110 is made out of a lightweight, non-heatsinking plastic or resin in order to avoid adding extra weight to the soldering device and so that heat shield 110 does not absorb heat from tip 140. This same material may also be used for the sliding switch, as shown in FIG. 3.

In another preferred embodiment of the present invention, it is advantageous to provide the vacuum system as an integral part of a soldering station external to soldering device 100 rather than being incorporated into soldering device 100. This embodiment is illustrated in FIG. 4, wherein the rear portion 250 of soldering device 100 is broken away for illustrative purposes, it being understood that the other components of device 100 are the same as those in FIG. 3. In FIG. 4, rear portion 250 does not include a corresponding microfan 270 but instead includes a slender, flexible plastic tube 300 which extends along side power cord 170 to transport solder smoke and fumes from the working area using external fan or vacuum pump 310. The configuration shown in FIG. 4 allows a more effective fan or pump to be used thereby improving smoke elimination capabilities, and also allows the size and weight of the soldering device to be decreased.

Although the present invention has been described above relative to exemplary embodiments thereof, it will be understood by those skilled in the art that variations and modifications can be effected in these embodiments without departing from the scope and spirit defined in the claims which follow.

What is claimed is:

1. A soldering assembly comprising:

a soldering tool including a solder tip;

a retractable heat shield mounted for movement on said soldering tool and movable between a first, retracted position wherein said solder tip is exposed and a second, protective position wherein said solder tip is covered by said heat shield; and a biasing means for biasing said retractable heat shield towards said second position.

2. A soldering assembly as recited in claim 1, wherein said retractable heat shield comprises a cylindrical tube.

3. A soldering assembly as recited in claim 2, wherein said retractable heat shield further comprises, at a top portion of said cylindrical tube closest to said solder tip, a converging taper shoulder.

4. A soldering assembly as recited in claim 1, further comprising a sliding switch located on said soldering tool and affixed to said heat shield for moving said heat shield between said first and second positions.

5. A soldering assembly as recited in claim 1, further comprising locking means for locking said retractable heat shield in said first position.

6. A soldering assembly as recited in claim 5, wherein said locking means comprises a retaining finger formed on a casing of said soldering tool.

7. A soldering assembly as recited in claim 1, wherein said soldering tool includes an outer casing and said biasing means comprises a spring disposed within said outer casing between a stop within said casing and one end of said heat shield.

8. A soldering assembly as recited in claim 1, wherein said heat shield provides a flow path for gases and heat from said solder tip and wherein said assembly further comprises suction means for creating a vacuum and for removing gases and heat from said solder tip flowing through said retractable heat shield.

9. A soldering assembly as recited in claim 8, wherein said suction means is incorporated into said soldering tool.

10. A soldering assembly as recited in claim 8, wherein said suction means comprises a suction source separate from said soldering tool and further includes a tube connection between said soldering tool and said suction source.

11. A soldering device as recited in claim 1, wherein said retractable heat shield is composed of a lightweight, non-heatsinking plastic.

12. A fume exhausting soldering assembly comprising:

a soldering tool including a solder tip;

fume exhausting means comprising a plastic exhaust tube including a converging taper shoulder at an end closest to said solder tip; wherein said plastic exhaust tube is movable between a first retracted position exposing said solder tip and a second protective position covering said solder tip;

biasing means for biasing said plastic exhaust tube towards said second position; and suction means for creating a vacuum and removing gases and heat flowing through said fume exhausting means from said solder tip.

13. A fume exhausting soldering assembly as recited in claim 12, wherein said suction means is incorporated into said soldering device.

14. A fume exhausting soldering assembly as recited in claim 12, wherein said suction means comprises a suction source separate from said soldering tool and further includes a tube connection between said soldering tool and said suction source.

15. A fume exhausting soldering assembly comprising:

a soldering tool including a soldering tip;

fume exhausting means comprising a retractable heat shield mounted for movement on said soldering tool, and moveable between a first retracted position wherein said solder tip is exposed, and a second protective position wherein said solder tip is covered by said heat shield;

biasing means for biasing said retractable heat shield toward said second position; and suction means for creating a vacuum and removing gases and heat flowing through said fume exhausting means from said solder tip.

\* \* \* \* \*